United States Patent Office 3,261,883
Patented July 19, 1966

3,261,883
ADHESIVES FROM POLYISOPHTHALAMIDES AND PHENOPLAST OR AMINOPLAST SYRUPS
Bert S. Gorton, Wilmington, Del., assignor to E. I. du Pont de Nemours and Company, Wilmington, Del., a corporation of Delaware
No Drawing. Filed Jan. 2, 1963, Ser. No. 248,870
6 Claims. (Cl. 260—841)

This invention relates to adhesive compositions and structures having surfaces adhesively joined together therewith.

Adhesive compositions comprising a synthetic linear polyamide and a thermosetting formaldehyde resin are old in the art. The thermosetting resins used in these compositions include the various phenol formaldehyde, urea formaldehyde, melamine formaldehyde and other such formaldehyde resins, all of which are very well known in the art. For brevity, all of these thermosetting formaldehyde resins are referred to hereinafter as "formaldehyde thermosets."

The polyamides most commonly used heretofore in the prior art may be classified as the so-called "nylon-type" polyamides and the "fatty acid-type" polyamides. The nylon-type polyamides are those formed by the condensation polymerization of a polyamine such as ethylene diamine, 1,4-diamino butane, hexamethylene diamine, and the like, with a polycarboxylic acid such as glutaric acid, adipic acid, pimelic acid, suberic acid, sebacic acid, and the like. All of the nylon-type polyamides have in common the presence of a plurality of recurring groups having the structure:

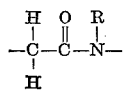

wherein R is hydrogen or an alkyl or alkoxy group having from 1 to about 4 carbon atoms. Many of these nylon-type polyamides are described in U.S.P. 2,071,253, U.S.P. 2,130,523, U.S.P. 2,130,948, and U.S.P. 2,285,009. The fatty acid-type polyamides are those prepared by the condensation polymerization of a polyamine with a polymeric fat acid produced from the polymerization of drying or semi-drying oils, such as soybean, linseed, tung, perilla, octicica, cottonseed, corn, tall, sunflower, safflower oils and the like, or the free acids, or simple aliphatic alcohol esters of such acids. Such fatty acid-type polyamides are described in U.S.P. 2,450,940.

The polyamide-formaldehyde thermoset compositions mentioned above have been used fairly extensively as adhesives, including use as metal adhesives, that is, as adhesives for adhering one metal substrate to another metal substrate or to some other type of substrate such as wood, glass, leather, plastic, and so forth. These compositions provide reasonably good bond strengths at room temperature and thus are satisfactory for some purposes. However, these compositions do not retain satisfactory bond strengths when the adhered substrates are subjected to elevated temperatures, especially when subjected to elevated temperatures in a moisture laden atmosphere or when directly contacted with hot or boiling water (which are both sometimes referred to as "hot-wet conditions").

For many applications it is essential to have an adhesive that will provide good bond strengths at elevated temperatures and under hot-wet conditions. For example, in the manufacture of metal containers for canning foodstuffs (the so-called "tin cans"), it is necessary to use a side-seam adhesive that will retain a satisfactory bond strength when the can is steam-sterilized. Another example is the provision of structural adhesives used in airplane construction, such as adhering wing surface metal to the structural frame, which will retain adequate bond strength under the high temperatures developed when the airplane is in super-sonic speed flight. Also in the manufacture of cookingware it is often convenient to use adhesives, for example, to join handles onto pots and pans, but it is obvious that the adhesive used must withstand the temperatures encountered when such pots and pans are used in cooking. Also, there exists a need for an adhesive for use in the manufacture of internal combustion engines, whereby the engine block may be die cast in two pieces and these two sections adhesively joined together. Not only must the adhesive withstand the elevated temperatures developed by the engine in operation, but in a water-cooled engine, the adhesive bond is subjected to hot-wet conditions. The polyamide-formaldehyde thermoset adhesives of the prior art are wholly unsatisfactory for such applications.

An object of this invention is to provide improved polyamide-formaldehyde thermoset adhesive compositions. Another object is to provide a polyamide-formaldehyde thermoset adhesive composition which provides good bond strengths between metal substrates and which retains adequate bond strengths at elevated temperatures, and furthermore which will retain adequate bond strengths under hot-wet conditions. Other objects will be apparent from the following description of this invention.

These objects are attained by the composition comprising 65–99 parts by weight of a polyamide having the recurring group of the formula:

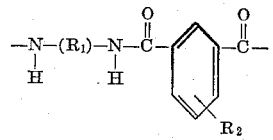

wherein $R_1$ is an alkylene radical having 2–16 carbon atoms and $R_2$ is a member of the group consisting of hydrogen, $C_1$–$C_5$ alkyl radicals and halogens, said polyamide having a molecular weight of 1,000–35,000, and 1–35 parts by weight of a thermosetting formaldehyde resin, preferably having a viscosity of 50–200,000 centipoises at 25° C.

The polyamides of this invention may be prepared by the condensation polymerization of an alkylene diamine having 2–16 carbon atoms, such as hexamethylene diamine, tetramethylene diamine, decamethylene diamine, undecamethylene diamine, dodecamethylene diamine, hexadecamethylene diamine, ethylene diamine and so forth, with isophthalic acid or a $C_1$–$C_5$ alkyl or halogen substituted isophthalic acid such as 5-t-butyl-isophthalic acid or 5-chloro-isophthalic acid. The exact method of preparation is not critical. Thus any convenient procedure known in the art may be followed, for example, as shown in U.S.P. 2,715,620.

It is essential that the polyamide used has a molecular weight within the range of about 1,000 to about 35,000. The bond strength obtained by the use of a polyamide having a molecular weight outside this range is too low to be of practical value. Furthermore, compositions derived from a polyamide having a molecular weight of less than about 1,000, do not possess adequate bond strength retention under hot-wet conditions. In addition, polyamides having molecular weights of more than about 35,000 do not readily mix with the formaldehyde thermosets of this invention and also compositions prepared from such polyamides require excessive time to form a bond between substrates. Therefore, in order to obtain practical bond strengths and the desired bond strength retention under elevated temperatures and hot-wet conditions it is necessary that the polyamide have a molecular weight that is within the aforesaid molecular weight range of about 1,000–35,000. Highest bond strengths are obtained by use of a polyamide having a molecular weight of about 5,000–15,000.

It is generally preferred that the formaldehyde thermoset be a syrup, that is, have a viscosity of from about 50 to about 200,000 centipoises at 25° C. In fact, for many uses it is essential that the formaldehyde thermoset be a syrup.

Relatively nonviscous formaldehyde thermosets can be blended with the polyamides of this invention to form adhesive compositions which exhibit bond strength retention at elevated temperature and under hot-wet conditions. However, these nonviscous formaldehyde thermosets have relatively low boiling points and thus are relatively volatile. Therefore, it is virtually impossible to use compositions prepared from such nonviscous formaldehyde thermosets as an adhesive between substrates wherein it is desirable to use heat to promote the reaction between the formaldehyde thermoset and the polyamide. In addition, such compositions tend to flow readily when subjected to a combination of heat and pressure. Thus, they cannot be used to bond together structural joints since some of the formaldehyde thermoset flows out from between the substrates leaving an insufficient amount to provide an adequate bond. However, there are some important uses for such compositions wherein these aforementioned deficiencies are of no consequence but wherein it is necessary to have the elevated temperature and hot-wet condition properties which these compositions exhibit, for example, use as a potting resin in the manner familiar to those skilled in the art.

Extremely viscous (i.e., over 200,000 centipoises at 25° C.) or even solid formaldehyde thermosets can be blended with the polyamides of this invention, for example, by dissolving the polyamide and the formaldehyde thermoset in a suitable solvent. However, the use of such an extremely viscous or solid formaldehyde thermoset imparts brittleness to the adhesive bond thus making such formaldehyde thermosets unsuitable for any use wherein impact strength is required. Even so, there are important applications wherein impact strength is not essential but wherein bond strength retention at elevated temperature and under hot-wet conditions is required, for example, in adhering name plates onto engine blocks.

The polyamides and formaldehyde thermosets used in the practice of this invention should be blended together in the proportion of 65–99 parts by weight of polyamide and 1–35 parts by weight of formaldehyde thermoset. Proportions outside of these specified ranges will result in compositions which do not possess bond strength retention at high temperatures and under hot-wet conditions.

The manner in which the polyamides and formaldehyde thermosets of this invention are blended together is not critical. The polyamide may be dissolved in a suitable polyamide solvent such as dimethylacetamide or dimethylformamide and the formaldehyde thermoset may then be added to the solution and mixed therewith. This polyamide solvent may be used in an amount sufficient to form a paste which can be directly applied to the surfaces to be adhered, or enough solvent can be used to form a liquid composition. Ultimately, the polyamide solvent can be removed by any convenient method, e.g., precipitation, air drying, spray drying, etc. to obtain a powdered blend of the polyamide and formaldehyde thermoset. The resultant powder may then be used to adhere surfaces together in the manner shown hereinbelow. Preferably, a fine powder of the polyamide is intimately mixed together with the formaldehyde thermoset without the use of a polyamide solvent. If desired, a suitable solvent for the formaldehyde thermoset may be used to facilitate this mixing procedure, or sufficient formaldehyde thermoset solvent may be used to form a paste. Suitable solvents for formaldehyde themosets include methanol, ethanol, the propyl alcohols, acetone, methyl ethyl ketone, and the like depending upon the particular formaldehyde thermoset employed. The compositions of this invention may also be prepared in the physical form of a film or tape by any of the methods familiar in the art. Generally, higher bond strengths are obtained when the composition is prepared by mixing the powdered polyamide and the formaldehyde thermoset without the use of a polyamide solvent.

The compositions of this invention may be used as adhesives for many different types of materials such as wood and other cellulosic materials, leather, glass, plastics and so forth. However, these compositions are primarily intended for use in adhering together metal substrates. These compositions can be used as adhesives for any metal including aluminum, magnesium, molybdenum, tungsten, iron, and the iron alloys such as the various steels, and the like.

In the practice of this invention, it is preferred to thoroughly clean or degrease the metal surface to be adhered and then etch the surface by treatment with acid prior to applying the adhesive composition. If the surfaces to be adhered together can be conveniently placed in a horizontal position, it is preferred to use a powder composition preferably prepared as mentioned above by mixing the polyamide and formaldehyde thermoset together without the use of a polyamide solvent. Otherwise, a film, tape or paste composition can be used. A relatively thin layer of the adhesive composition is applied to one of the surfaces. Then the other surface is placed into position and this assembly is pressed under a relatively light load (i.e., about 10 to 2,000 p.s.i.) at a temperature of about 350° F.–600° F. for sufficient time to complete the interaction (crosslinking) of the polyamide and the formaldehyde thermoset, usually about 10–60 minutes. The metals thus joined are ready for use as desired. Other procedures for using the compositions of this invention will be obvious to those skilled in the art.

The following examples further illustrate preferred embodiments of this invention. In each of these examples, to provide correlative data, strips of 7075–T6 aluminum (Lyman, Ed., Metals Handbook, vol. I, "Properties and Selection of Metals," American Society for Metals, Novelty, Ohio, 8th Ed., 1961, p. 948) are used as the metal substrates. These aluminum strips are 0.065 inch thick and measured 1 in. x 3 in. These strips are degreased by suspending them in trichloroethylene vapor. Following the degreasing, these strips are etched in a chromic acid bath at 70° C. for 30 minutes, washed in cool water and then dried. Standard lap joints are prepared by applying the various compositions shown onto the surface of one strip and then positioning another strip on top thereof to form a 0.5 inch overlap (ASTM D1002–53T). These lap joints are then pressed together with 2,000 p.s.i. pressure at 450° F. for 30 minutes (except as noted). The bond strengths of the various adhesive compositions are evaluated by determining the lap shear strengths of the prepared lap joints, in accordance with ASTM D1002–53T, whereby the strips are pulled apart at a rate of 0.2 in./min. at a jaw separation of 4½ inches. All of the lap shear strength values shown are the average of at least 3 trials.

*Example 1*

To 10 grams of finely powdered (100 mesh) poly(hexamethylene isophthalamide) having a molecular weight of 9,000 is added 1 gram of a liquid partially etherified phenol formaldehyde thermosetting resin having a viscosity of 500 centipoises at 25° C. The mixture is blended by grinding in a mortar and then dried in a vacuum oven at 50° C. for 15 hours at 28 inches Hg. The dried powder is broken up, reground and used as the adhesive to form the standard lap joints. At room temperature the average lap shear strength is 5,400 p.s.i.; at 100° C. the average lap shear strength is 4,450 p.s.i. When tested after being heated in a steam autoclave at 250° F. and 15 p.s.i.g. for 24 hours and cooled to room temperature, the average lap shear strength is 4,500 p.s.i.

Example 2

Example 1 is repeated using a liquid melamine formaldehyde thermosetting resin having a viscosity of 20,000 centipoises at 25° C., in place of the phenol formaldehyde resin shown therein. Similar results are obtained.

Example 3

Example 1 is repeated using a liquid urea formaldehyde thermosetting resin having a viscosity of 75,000 centipoises at 25° C., in place of the phenol formaldehyde resin shown therein. Similar results are obtained.

Example 4

Example 1 is repeated using in place of the poly(hexamethylene isophthalamide) as shown therein, poly(hexamethylene 5-t-butyl-isophthalamide) having a molecular weight of 9,000. Similar results are obtained.

Example 5

Example 1 is repeated using in place of the poly(hexamethylene isophthalamide) as shown therein, poly(hexamethylene 5-chloro-isophthalamide) having a molecular weight of 9,000. Similar results are obtained.

Example 6

Example 1 is repeated using in place of the poly(hexamethylene isophthalamide) as shown therein, poly ethylene isophthalamide) having a molecular weight of approximately 9,000. Similar results are obtained.

Example 7

Example 1 is repeated using in place of the poly(hexamethylene isophthalamide) as shown therein, poly(decamethylene isophthalamide) having a molecular weight of 11,000. Similar results are obtained.

Example 8

Ten grams of 100 mesh poly(hexamethylene isophthalamide) having a molecular weight of 9,000 is added to 0.5 gram of a solid cashew nutshell oil phenol formaldehyde thermosetting resin containing 8% by weight hexamethylenetetramine and having a softening point of 116–127° C. dissolved in methanol (30% solution). The methanol is evaporated and the residual solids are dried and ground. The resultant powder is used to make standard lap joints as described above. When tested at 25° C. these joints have an average lap shear strength of 2,240 p.s.i.

Example 9

Ten grams of 100 mesh poly(hexamethylene isophthalamide) having a molecular weight of 9,000 is added to 30% ethanol solution of 5 grams of a solid phenol formaldehyde thermosetting resin having a softening point of about 200° F. A powder is prepared and lap joints are formed and tested as shown in Example 8. The average lap shear strength at 25° C. is 1,320 p.s.i.

This invention has been described in considerable detail. However, since many obvious modifications and variations can be made from these details without departure from the spirit and scope of this invention, it is to be understood that this invention is not to be limited except as defined by the appended claims.

I claim:

1. An adhesive composition consisting essentially, per 100 parts by weight, of 65–99 parts by weight of a polyamide consisting essentially of recurring groups of the general formula

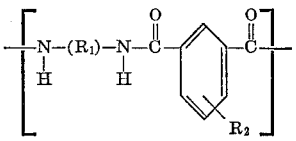

wherein $R_1$ is an alkylene radical having 2–16 carbon atoms and $R_2$ is a member of the group consisting of hydrogen, $C_1$–$C_5$ alkyl radicals, and halogens, said polyamide having a molecular weight of 1,000–35,000, and 1 to 35 parts by weight of a thermosetting phenol-formaldehyde, melamine-formaldehyde, or urea-formaldehyde resin having a viscosity of 50–200,000 contipoises at 25° C.

2. A composition according to claim 1 wherein the polyamide is poly(hexamethylene isophthalamide) having a molecular weight of 5,000–15,000.

3. A composition according to claim 1 wherein the polyamide is poly(hexamethylene 5-t-butyl-isophthalamide) having a molecular weight of 5,000–15,000.

4. A structure having two surfaces adhesively joined together with the composition of claim 1.

5. A structure according to claim 4 wherein the polyamide of said composition is poly(hexamethylene isophthalamide) having a molecular weight of 5,000–15,000.

6. A structure according to claim 4 wherein the polyamide of said composition is poly(hexamethylene 5-t-butyl-isophthalamide) having a molecular weight of 5,000–15,000.

References Cited by the Examiner

UNITED STATES PATENTS

| | | | |
|---|---|---|---|
| 2,607,709 | 8/1952 | Simpson et al. | 260—841 |
| 2,715,620 | 8/1955 | Carlston et al. | 260—78 |
| 2,799,596 | 7/1957 | Frantz | 260—841 |

FOREIGN PATENTS

| | | |
|---|---|---|
| 520,575 | 1/1956 | Canada. |
| 1,230,883 | 8/1960 | France. |

MURRAY TILLMAN, *Primary Examiner.*

J. C. BLEUTGE, *Assistant Examiner.*